United States Patent [19]

Weber

[11] 4,455,322
[45] Jun. 19, 1984

[54] METHOD FOR COATING ITEMS

[75] Inventor: Hermann P. Weber, Tarzana, Calif.

[73] Assignee: Techsight Corporation, Wilmington, Del.

[21] Appl. No.: 370,901

[22] Filed: Apr. 22, 1982

Related U.S. Application Data

[62] Division of Ser. No. 273,461, Jun. 15, 1981, Pat. No. 4,345,546.

[51] Int. Cl.³ .......................... B05D 1/18; G02B 1/10
[52] U.S. Cl. .......................................... 427/8; 427/162; 427/164; 427/169; 427/430.1
[58] Field of Search ................... 427/8, 162, 164, 169, 427/430.1

[56] References Cited

U.S. PATENT DOCUMENTS 3,956,540  5/1976  Laliberte et al. .................. 118/425
4,036,168  7/1977  Laliberte et al. .................. 118/675
4,267,208  5/1981  Ireland ............................ 427/164 X Primary Examiner—James R. Hoffman
Attorney, Agent, or Firm—Blakely, Sokoloff, Taylor & Zafman

[57] ABSTRACT

The invention comprises a method for providing a coating to objects such as a lens. A bath of coating solution is provided and the objects are immersed into the solution and removed from the solution at a constantly changing speed. The speed of removal is slower at the top and bottom of the object and faster at the midpoint of the object. Thus the coating is thinner at the top and bottom and thicker at the center (where greater abrasion resistence is required). The slower speed at the removal of the bottom edge of the lens from the solution provides a thin coating and eliminates the formation of coating drip lines and puddles.

3 Claims, 9 Drawing Figures

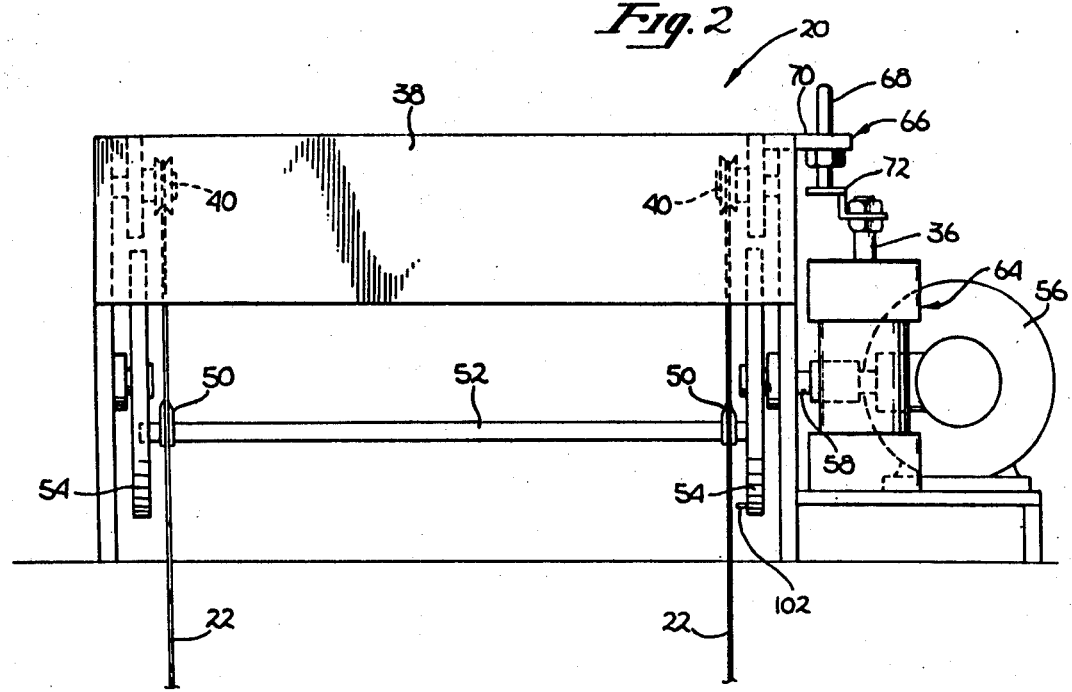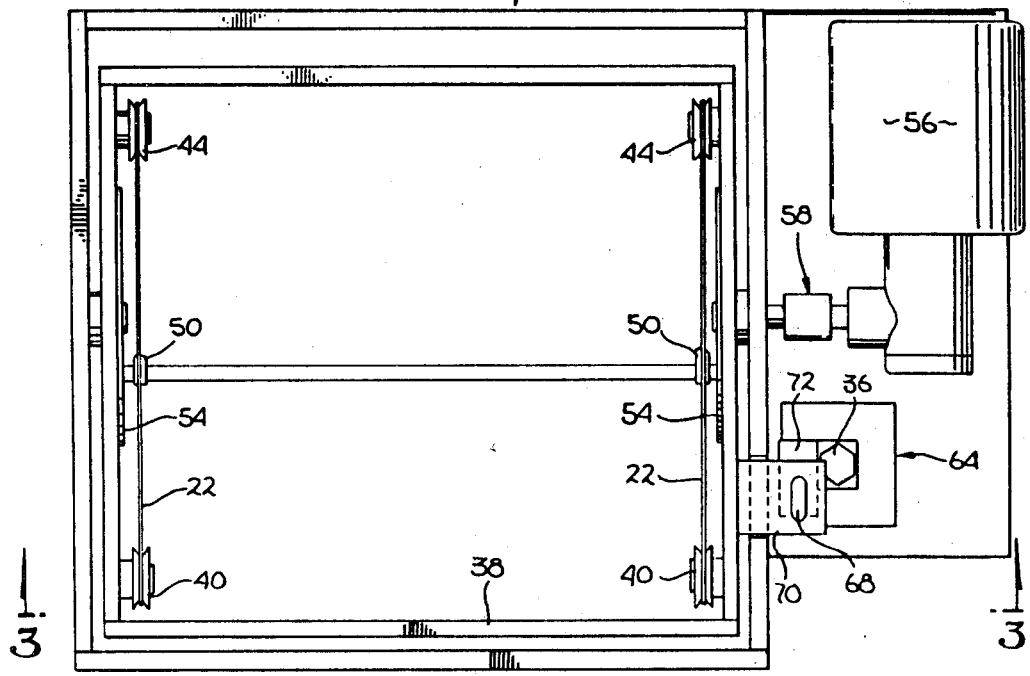

METHOD FOR COATING ITEMS

This is a division of application Ser. No. 273,461, filed June 15, 1981, now U.S. Pat. No. 4,345,546.

PRIOR ART STATEMENT

This prior art statement is submitted in conformance with Rule 1.98. The most pertinent references of which applicant is aware comprise the following two U.S. Patents.

U.S. Pat. No. 4,036,168 issued 7-19-77 to LALIBERTE

U.S. Pat. No. 3,956,540 issued 5-11-76 to LALIBERTE

Both of these patents deal with essentially the same subject matter, the U.S. Pat. No. 4,036,168 being a Division of U.S. Pat. No. 3,956,540. The patents describe and claim a method and apparatus for coating articles, specifically synthetic resin optical lenses. The apparatus and method are designed to produce a coating of uniform thickness (see U.S. Pat. No. 3,956,540 column 7 lines 48 to 58) on the object. Thus, the objects are lowered into the coating solution at a first controlled rate and removed from the solution at a second (uniform) rate different from the first rate.

SUMMARY OF THE INVENTION

The invention comprises a method for providing a coating to objects such as a lens. A bath of coating solution is provided and the objects are immersed into the solution and removed from the solution at a constantly changing speed. The speed of removal is slower at the top and bottom of the object and faster at the midpoint of the object. Thus the coating is thinner at the top and bottom and thicker at the center (where greater abrasion resistence is required). The slower speed during the removal of the bottom edge of the lens from the solution provides a thin coating and eliminates the formation of coating drip lines and puddles.

DESCRIPTION OF THE DRAWINGS

FIG. 2 is a front plan view of the top or power driven portion of my apparatus.

FIG. 3 is a top plan view of the apparatus.

DETAILED DESCRIPTION

Figure 1:
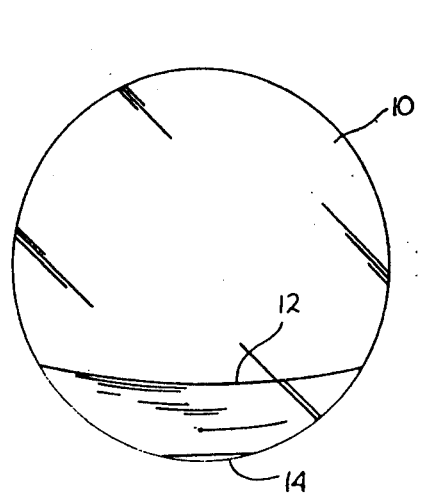
FIG. 1 shows a lens with drip lines and puddle resulting from coating according to the prior art methods.

Lenses coated according to the methods of the prior art are typically immersed into the coating solution and removed from the coating solution at a constant speed. The speed of immersion may or may not be the same as the speed of removal. It is also well known that for a coating solution of a given viscosity the thickness of the coating varies directly with the speed of removal. Thus greater removal speeds produce coatings of greater thickness. Because thicker coatings exhibit greater resistence to abrasion, it is generally desirable to remove the lenses at relatively high speeds. If an entire lens is removed at the same relatively high speed, defects in the coating occur as shown in FIG. 1. The lens 10 was removed from the coating bath at a uniform and relatively high speed to produce a thick, abrasion resistant coating. The rapid removal of the lens 10 from the coating solution caused excess coating solution to adhere to the lens. When the lens 10 was completely removed from the coating solution, excess solution had not finished draining off the lens. As a result a puddle of coating solution formed and as the puddle slowly grew and dripped off the lens, a series of drip lines 12 formed on the lens. Because the bottom of the lens was not in contact with the coating solution when the last drop of excess coating solution was ready to drain from the lens, it remained on the lens and hardened forming a puddle 14. Defects such as drip lines 12 and puddles 14 unacceptably distort the optical qualities of a lens 10.

By practicing my invention I have found that I can substantially eliminate drip lines and puddles. I have noted that most lens abrasion occurs in the central portion of a lens. Thus it is really only necessary to apply a relatively thick coating near the center of a lens. I have also discovered that by removing the bottom edge of a lens from the coating solution at a very slow speed, the draining excess coating solution has sufficient time to drain to the bottom of the lens and to be drawn off the lens by the surface tension of the coating solution bath. Thus, the last drop of excess solution does not remain on the lens and no puddle 14 forms.

Figure 6:
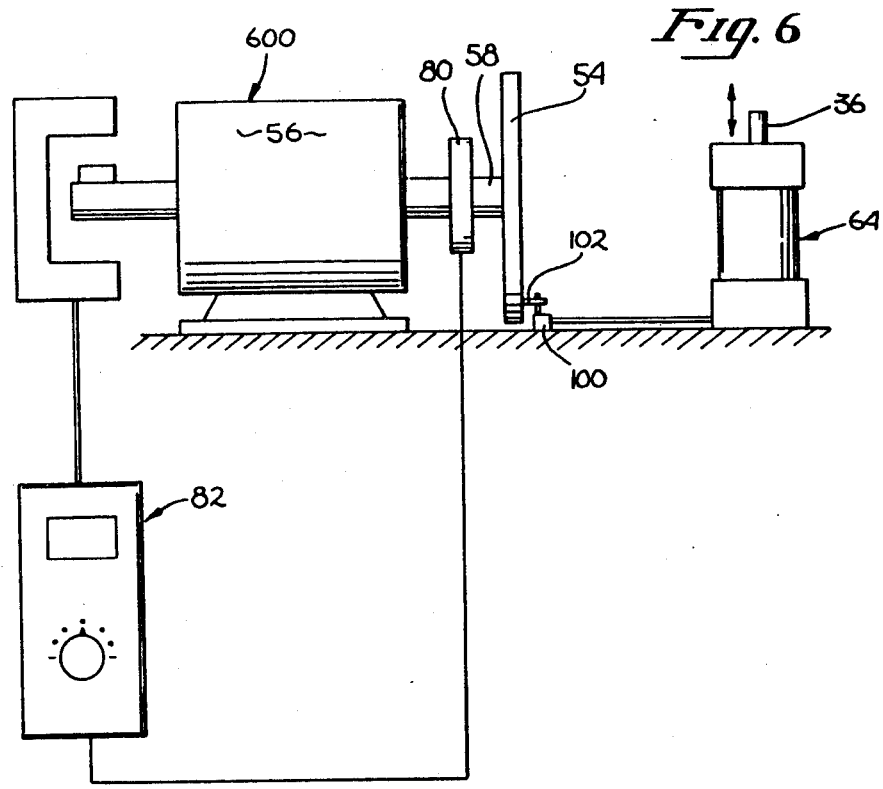
FIG. 6 is a functional diagram of the electronic control system used to control the motion of the apparatus.

My method for coating lenses is implemented by the coating device, shown in various views, in FIGS. 2 through 5. The coating device is controlled by the control system 600 illustrated functionally in FIG. 6.

The heart of my invention resides in providing the emerging lens with a velocity of removal profile which is nearly sinusoidal. Thus the velocity is less when the top and bottom edge of the lens passes through the surface of the coating solution and gradually increases to a maximum velocity as the center of the lens emerges from the surface of the coating solution.

FIGS. 2 through 5 illustrate the motion control device used to generate such a velocity profile.

Figure 4:
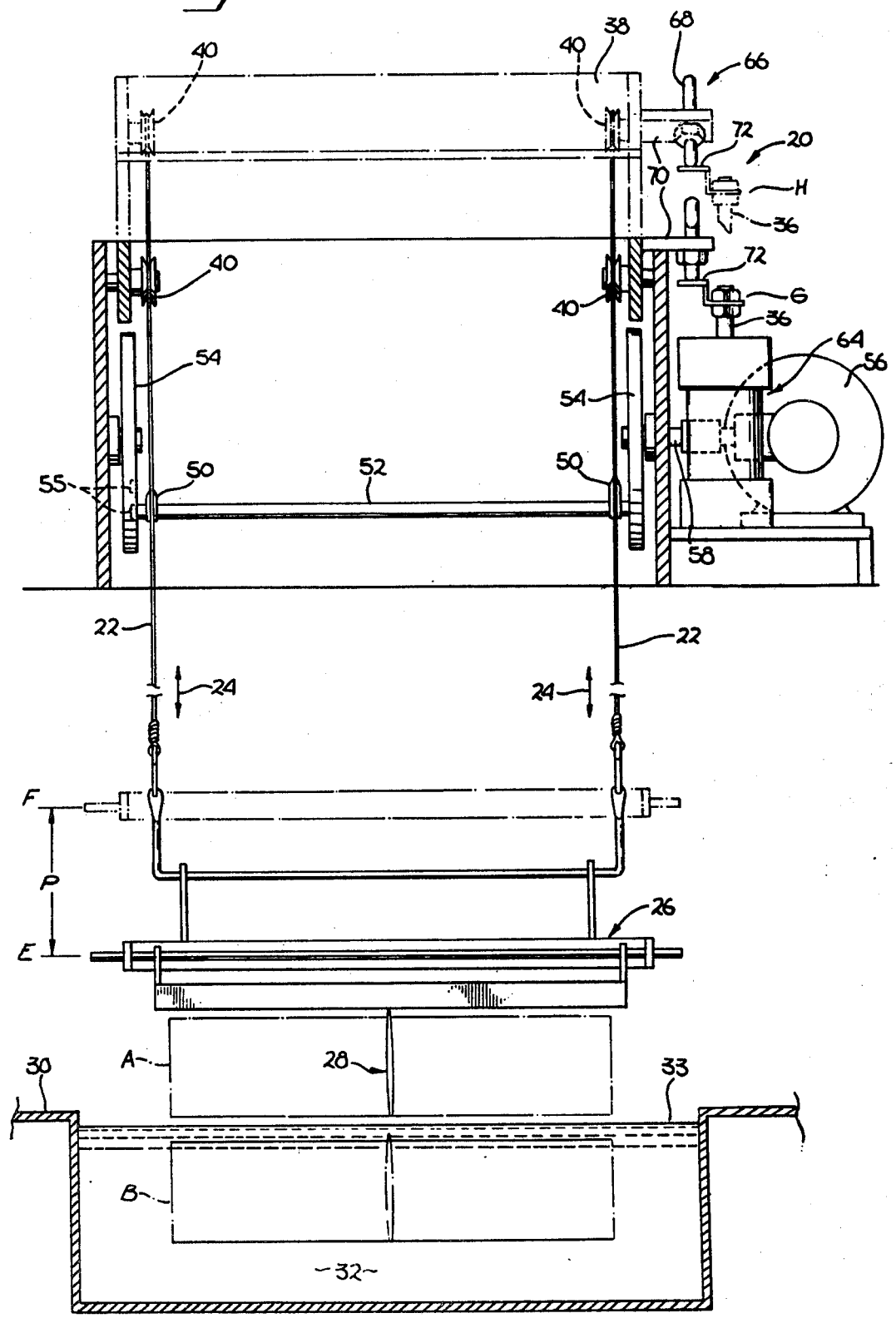
FIG. 4 is a front plan view of the entire coating apparatus.

The motion control device 20 controls the vertical velosity, of cords 22, indicated by double headed arrows 24 in FIG. 4. A lens rack 26 is suspended from the cords 22. A plurality of lenses 28 are hung in the rack 26. A container 30 holds a volume of coating solution 32 directly beneath the rack 26 and lenses 28. By causing the cords 22 to move vertically upward and downward a sufficient distance, the plurality of lenses 28 will be caused to move from a first position A, where the lenses 28 are entirely above the surface 33 of coating solution 32, to position B where the lenses 28 are entirely below the surface 33. The velocity with which any point on a lens passes through the surface 33 is determined by the velocity profile given to cords 22 by the motion control device 20.

As stated above, the thickness of the coating applied to a lens is dependent upon the speed with which the lens is removed from the coating solution. To achieve a lens coating with the desirable qualities discussed above it is necessary to have a low velocity of removal at the top and bottom edges of the lens and a relatively fast velocity near the center of the lens. Since the coating is formed as the lens emerges, once the lens has completely emerged from the coating solution it is desirable to prevent the lens from re-entering the coating solution. The motion control device 20 is therefor provided with a means for detecting the complete emergence of the lenses 28 upon such detection to raise the rack 26 vertically upward a distance P such that the continued vertical up and down motion of the cords 22 will not cause any part of the lenses 28 to reenter the coating solution 32. This is assured if the distance P is greater than the distance D representing the limits of excursion of the lenses and rack 26 during the coating of the lenses 28. This distance D will be given a more definite physical dimension below in connection with the discussion of the motion control device 20. The rack 26 moves the distance P as it moves from position E to position F. This movement of rack 26 occurs when piston 36 moves from position G to position H, raising pivotable frame member 38 and attached pulleys 40, which in turn causes cords 22 to raise rack 26.

The nature of the motion of cords 22 is determined by the motion control device 20 shown in various views in FIGS. 2 through 5. One end of each cord 22 is attached to a slip ring 50 mounted over cross bar 52. Each end of cross bar 52 is rigidly secured to a respective rotatable disk 54. One disk 54 is rotationally driven by a motor 56 through drive train 58. The other disk 54 is slaved to the rotation of the driven disk by cross bar 52. Thus, as the disks 54 rotate, the ends of cords 22 attached to slip rings 50 will follow a circular path most easily visualized in FIG. 5a. The diameter of the circular path of travel of the ends of cords 22 is equal to D, which is identical to the distance D between lens positions A and B. Thus, to ensure that the lenses 28 are fully immersed in coatingg solution 32, D must be at least slightly greater than the diameter of the lenses 28. Distance D is controlled by the radial position at which the ends of cross bar 52 are secured to disks 54. A plurality of mounting recesses 55 are provided in disks 54, at various preselected radial distances, so that the cross bar 52 may be set to the various distances thereby permitting selection of distance D.

By appropriate placement of pulleys 40 and 42, the movement of rack 26 is constrained to purely vertical movement, even though the ends of cords 22 follow a circular path. Elementary trigonometric analysis can be used to derive the nature of the motion of rack 26 and lenses 28. If the disk 54 is driven to rotate at an angular velocity of $\omega$ (omega) radians per second, then the velocity of the rack 26, and hence of the lenses 28, can be shown to be $$\omega D/2 \sin\alpha \cos\beta \quad (1)$$

where D is the diameter of the circular path traveled by the cross bar 52, $\alpha$ is the instantaneous angular displacement of the disk 54 from time zero (t=0), and $\beta$ is the instantaneous angular displacement of cord 22 about pivot point PP measured from the reference time (t=0) (where $\beta$=0). Of course, if the distance from PP to the center of disk 54 is known, then $\beta$ can be written in terms of $\alpha$. If the distance from PP to the center of disk 54 is some number of times greater than r, say nr, then $$\beta = \tan^{-1}\left(\frac{r \sin\alpha}{nr + r \cos\alpha}\right) \quad (2)$$

for $\alpha$ measured positive in the counterclockwise direction from the point t=0.

Figure 5A:
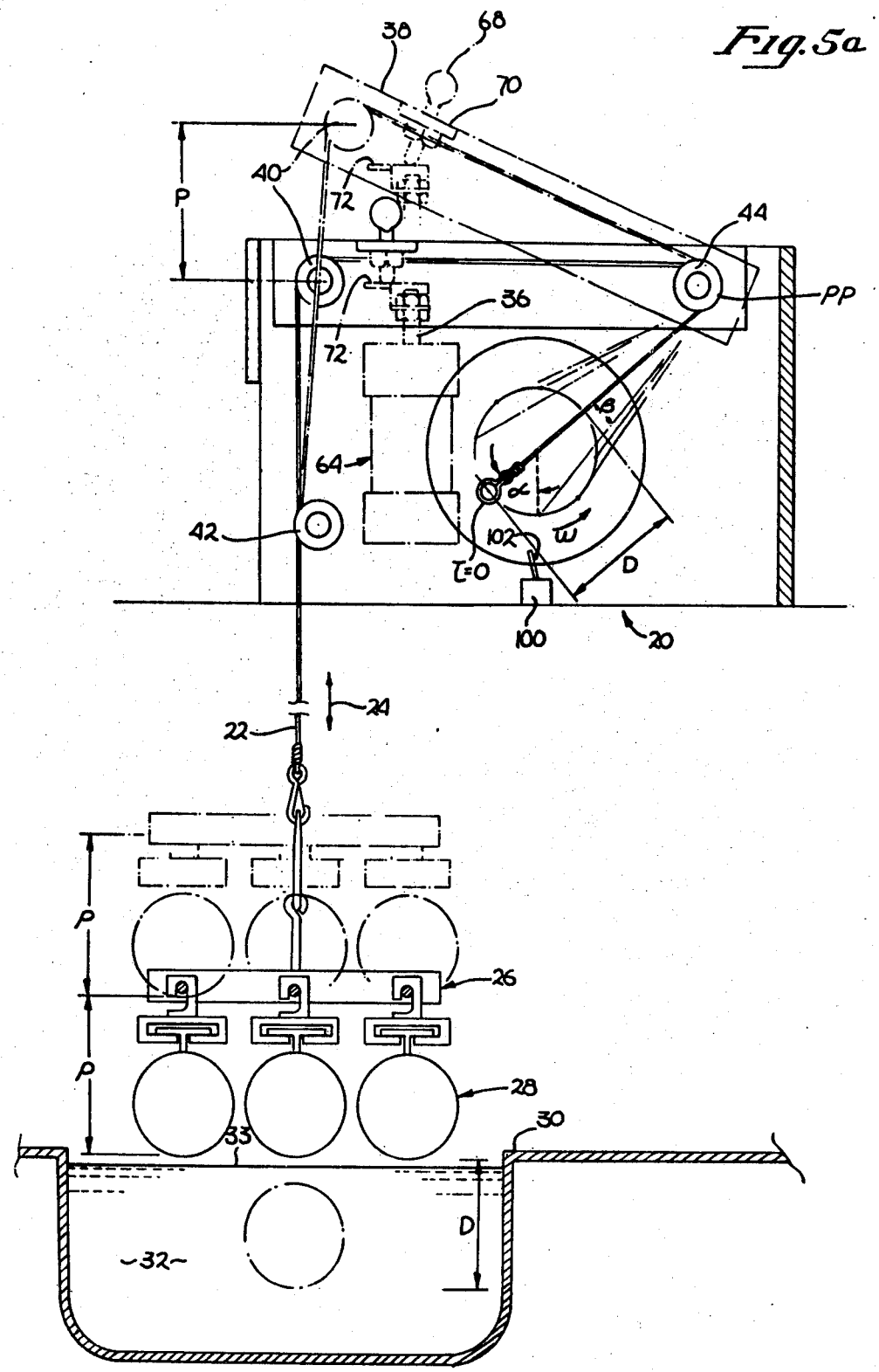
FIG. 5a is a side view of the apparatus of FIG. 4
Figure 5B:
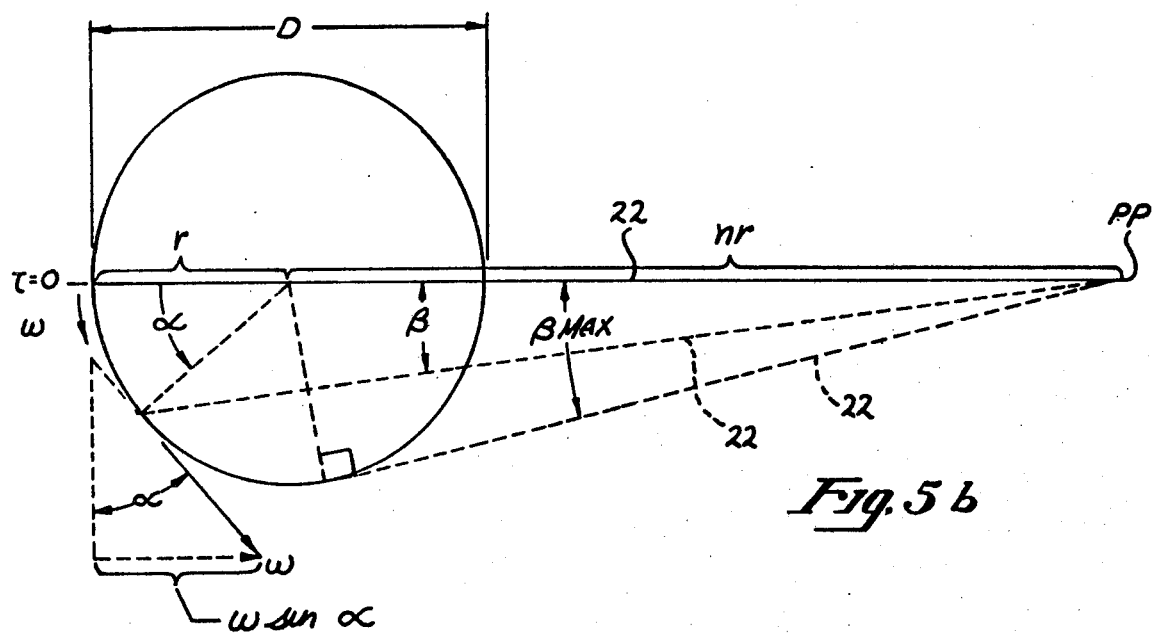
FIG. 5b is a diagram illustrating the trigonometric relationships which determine the velocity of the rack.

From FIG. 5b it is apparent that the angle $\beta$ reaches a maximum when:

$$\sin\beta_{max} = \frac{r}{nr} \text{ or } \frac{1}{n} \quad (3)$$

when $\beta$ is maximum, $\cos\beta_{max}$ is minimum. For n=2, $\cos\beta_{max}$=0.866, hence, from (1), $$\omega D/2 \sin\alpha \cos\beta$$

is always within 0.866 of being equal to $\omega D/2 \sin\alpha$ and the velocity of rack 26 is approximately sinusoidal. When n=3, $\cos\beta_{max}$=0.9428, and hence $\omega D/2 \sin\alpha \cos\beta$ is always within 0.9428 of being equal to $\omega D/2 \sin\alpha$ and the velocity of rack 26 is even more closely sinusoidal.

As n increases the velocity of rack 26 gets closer and closer to being equal to $\omega D/2 \sin\alpha$, i.e. more nearly sinusoidal. At n=6, $\cos\beta_{max}$=0.9860.

Figure 5C:
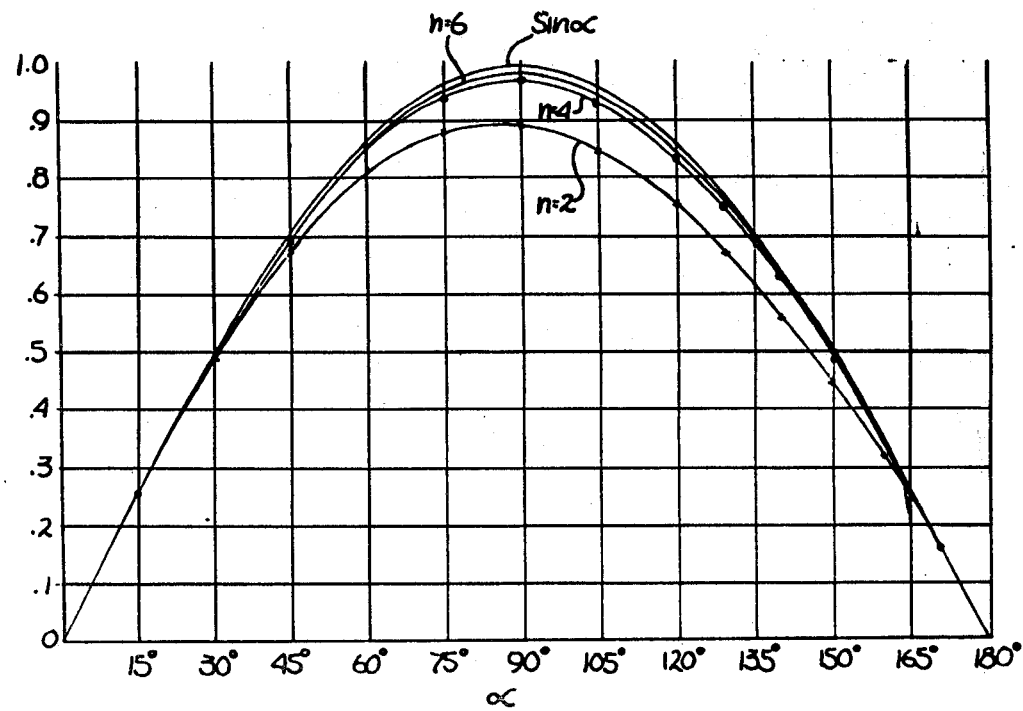
FIG. 5c is a graph comparing the velocity of the rack to true sinusoidal velocity.

A graph of $$\beta = \tan^{-1}\left(\frac{\sin\alpha}{n + \cos\alpha}\right)$$

is shown in FIG. 5c for easy comparison with $\sin\alpha$.

Because the rack 26 is suspended from cord 22 which runs over pulley 42 (see FIG. 5a) which is forward of pulley 40, the motion of rack 26 is always purely vertical.

Once the lenses 28 have been coated and have fully emerged from coating solution 32, i.e. the lenses 28 have risen from position B to position A, some method must be employed to prevent the lenses 28 from reentering the coating solution. One approach could be to stop the rotation of disks 54 just as position A is reached. An alternative approach has been adopted. A microswitch 100 (see FIGS. 5a and 6) is positioned to be contacted by a pin 102 when lenses 28 are in position A. This is the position the lenses 28 reach after they have been coated. The rack 26 is then in corresponding positon E. When the microswitch 100 is activated, a signal is sent to air cylinder 64 to drive piston 36 upward. The piston 36 acts against adjustable arm 66 mounted on frame 38 to drive the frame, pivoted about the axis of pulley 44, upward at its forward end from position G to position H. This pivoting raises the rack 26 further, and raises it a distance (P) such that the continued rotation of disks 54 will not cause any portion of lenses 28 to reenter coating solution 32, thus P is somewhat greater than D.

Once the frame 38 has been raised, an operator may remove the rack 26 at a convenient time and replace it with fully loaded rack of uncoated lenses. The operator then manually activates a switch to cause the air cylinder 64 to retract piston 36. Ideally, the frame 38 should be lowered just prior to the cross-bar 52 reaching the t=0 position shown in FIG. 5. This will assure that the rack 26 and lenses 28 are approximately at positons E and A (see FIG. 4) respectively when the frame reaches position G. The lenses 28 are then at the beginning of their dipping cycle, just ready to be lowered into the coating solution 32. While the lowering of the frame 38 may be triggered manually, it is preferable to devise appropriate electrical switching apparatus to automatically lower the frame 38 such that as the frame reaches position G, the lenses 28 reach position A, ready to begin entering the coating solution.

An automatic mechanism for raising and lowering the frame 38 might comprise a microswitch 100 activated by a pin 102 mounted on a disk 54 such that the pin 102 reaches exactly its lowest position when the cord 22 reaches position t=0, i.e. the lenses 28 would be at their "rest" position at the top of their dipping cycle. One trip of microswitch 100 would activate the air cylinder 64 to raise the piston 36 and frame 38, the next trip of the switch would lower the piston and frame. Since one revolution of disk 54 is typically a minute or so, an operator would have plenty of time to remove a rack of coated lenses and reload with a rack of uncoated lenses, even with the disks continuing to rotate. Alternatively, the microswitch 100 could also trigger a mechanism to stop rotation of the disk 54 when the piston was not at its lowest position.

Because with each coating of lenses, some quantity of coating solution is removed from the container 30, an adjustment means, adjustable arm 66, is provided to fine tune the distance of frame 38 above the surface 33 of the coating solution. The adjustable arm 66, as best illustrated in FIGS. 2 and 5, comprises a thumbscrew 68 threaded in arm 70 of frame 38, with the bottom of the thumbscrew resting on top of piston 36. Clockwise rotation of thumbscrew 68 raises frame 38 above the piston 36 and hence also raises the rest position of lenses 28 (at the peak of their path of travel) above the surface 33. Counterclockwise rotation brings the lenses 28 closer to surface 33. As the level of coating solution lowers due to coating of lenses, counterclockwise rotation of thumbscrew 68 will adjust the "rest" height of the lenses 28 above surface 33 to remain relatively constant and thereby insure uniform coating of multiple racks of lenses.

To insure that the "thickness" of the coating of the lenses keeps the same profile from one rack of lenses to the next, it is necessary to accurately control the speed of the drive motor 56. This may be accomplished in a number of ways with one such way schematically illustrated in FIG. 6. There, device 80 senses the output rotational velocity of the motor shaft and generates a signal proportional thereto, which is provided to a commercially available electronic motor speed controller 82. The controller 82 compares the motor speed represented by the provided signal with the preselected speed dialed into the controller 82. The comparison produces an error signal which drives the motor speed adjustment device 84 to change the motor speed and drive the error signal to zero.

Figure 7:
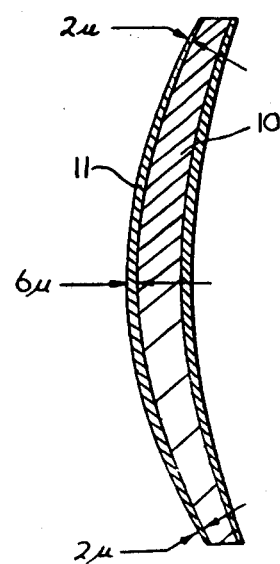
FIG. 7 is a cross-section of a lens coated by the method of my invention.

By proper adjustment of the rotational speed of motor 56 and hence of disks 54 and cross bar 52, a lens coating having a profile substantially as shown in FIG. 7 can be obtained. At the top and bottom of the lens 10, the coating may be approximately 2 microns thick, while at the center it will be about 6 microns. For a given viscosity of coating solution, the thickness of the coating can be adjusted by adjusting the speed of motor 56. The thickness profile will remain approximately sinusoidal as illustrated by the graphs in FIG. 5c.

Typically, the motor 56 may be a Bodine motor, such as model NH 12, a 1/50 HP model. A 432:1 gear reduction is used. At 100 RPM of the motor, we have a disk 54 velocity of 0.2315 RPM or 4.32 minutes for 1 revolution. If the cross bar is set for a circular path 80 mm in diameter, then the rack 26 will travel 160 mm in 4.32 minutes (about 1.458 inches in 1 minute for an average speed). Use of other motor speeds will change the thickness of the coating, but the coating profile will remain approximately sinusoidal. At a more typical motor rotational speed of 450 RPM, we have a disk velocity of 1.04717 RPM or an average linear velocity of 166,67 mm per minute (6.562 inches per minute average). At a rotational speed of 300 RPM, using a coating solution 32 typical of which is Q9-6312 A.R.C. available from Dow Corning, at 10 degrees C. having a viscosity of 22 centipoises, an edge coating of 3 microns thickness and a center coating of 9 microns thickness was obtained.

While the invention has been described with particular reference to the coating of optical lenses, it is obvious that the invention is not limited to optical applications. The descriptions and FIGS. 1 through 7 are intended as merely illustrative of a particular embodiment and application of the invention, and should not be interpreted in a limiting sense, but rather as descriptive only. It is contemplated that many changes in both materials and structure may be made without departing from the spirit and scope of the invention which is intended to be limited only by the scope of the appended claims.

What is claimed is:

1. A method for coating articles comprising the steps of:
    (a) providing a volume of coating solution;
    (b) suspending said articles above the surface of said volume of coating solution.
    (c) lowering said articles completely into said coating solution;
    (d) drawing the top end of said articles out of said coating solution with an initial low velocity of exiting;
    (e) gradually increasing the velocity of exiting to a maximum velocity of exiting as the central portion of said articles exit said coating solution;
    (f) gradually decreasing said velocity of exiting back to said low velocity as the bottom end of said articles exit said coating solution.

2. The method according to claim 1 wherein said velocity of exiting has an approximately sinusoidal time profile.

3. The method of claim 1 further comprising the steps of:
    (g) detecting the exiting of the bottom edge of the items from the coating solution and generating a signal indicative of said exiting;
    (h) raising said rack in response to said signal farther above the surface of the coating solution to prevent re-entry of the items into said coating solution.

* * * * *